United States Patent [19]

Armbruster

[11] Patent Number: 4,707,958
[45] Date of Patent: Nov. 24, 1987

[54] FIXED-PANE MOTOR-VEHICLE WINDOW AND METHOD OF INSTALLING SAME

[75] Inventor: Günter Armbruster, Düsseldorf, Fed. Rep. of Germany

[73] Assignee: Flachglass Aktiengesellschaft, Furth, Fed. Rep. of Germany

[21] Appl. No.: 775,841

[22] Filed: Sep. 13, 1985

[30] Foreign Application Priority Data

Sep. 15, 1984 [DE] Fed. Rep. of Germany ....... 3434026

[51] Int. Cl.⁴ .............................................. E06B 3/00
[52] U.S. Cl. ...................................... 52/208; 156/108
[58] Field of Search ............. 52/208, 400, 403, 309.1; 156/108

[56] References Cited

U.S. PATENT DOCUMENTS

| | | | |
|---|---|---|---|
| 2,368,297 | 11/1945 | Slaughter | 52/309.1 |
| 2,647,070 | 7/1953 | Litton | 156/108 |
| 3,303,626 | 2/1967 | Brigham | 52/309.1 |
| 3,659,896 | 5/1972 | Smith et al. | 52/403 |
| 3,759,004 | 9/1973 | Kent | 52/403 |
| 3,868,789 | 3/1975 | Gates | 52/309.1 |
| 3,968,612 | 7/1976 | Endo et al. | 156/108 |
| 4,115,609 | 9/1978 | Denman | 428/68 |
| 4,139,234 | 2/1979 | Morgan | 52/208 |
| 4,477,507 | 10/1984 | Kunert | 52/403 |

FOREIGN PATENT DOCUMENTS 0073350 10/1982 European Pat. Off. .
3203580 9/1983 Fed. Rep. of Germany .
3134340 9/1983 Fed. Rep. of Germany .

Primary Examiner—James L. Ridgill, Jr.
Attorney, Agent, or Firm—Karl F. Ross; Herbert Dubno; Andrew Wilford

[57] ABSTRACT

A rigid window pane having an edge is mounted in a rigid window opening having a rigid border with an annular gasket by first providing on the outer periphery of the gasket a layer of adhesive and fitting the gasket around the edge of the pane. Then the pane carrying the gasket is fitted to the window opening with the adhesive layer engaging the opening border and at the same time the pane carrying the gasket is heated and pressed into this opening to soften the gasket until it externally deforms plastically to complementarily fit the opening border. Subsequently the gasket is cooled and cured so it hardens and retains the shape imparted to it by the heat and pressure. The gasket is formed of a thermoplastic synthetic resin or of a vulcanizable or polymerizable, that is heat-curing, synthetic resin or rubber. The polymerization can include the processes of polycondensation or polyaddition.

14 Claims, 3 Drawing Figures

FIXED-PANE MOTOR-VEHICLE WINDOW AND METHOD OF INSTALLING SAME

FIELD OF THE INVENTION

The present invention relates to a fixed-pane motor-vehicle window, that is a window that does not slide or pivot in its frame. More particularly this invention concerns a method of installing such a window in an opening of a motor-vehicle body.

BACKGROUND OF THE INVENTION

A standard fixed-pane motor vehicle window comprises an appropriately shaped pane of glass or like transparent material and an annular at least partially U-shaped gasket fitted over the edge of the pane and shaped to fit within the border of a window-frame opening in the vehicle body. The gasket compensates for the inevitable minor differences in shape between the edge of the rigid pane and the border of the window opening. Typically an adhesive is used between the gasket and window-pane edge on the inside and between the gasket and the window-opening border on the outside.

In the arrangement of German patent No. 4,477,507 of H. Kunert the U-legs of the gasket are secured to the pane by a heat-activatable adhesive. In addition a metallic inlay is imbedded in the gasket so that, whereas the gasket itself is made of an elastomeric and/or at least partially flexible material, the metallic inlay can be plastically deformed in order to impart a desired shape to the gasket. This is done by mounting the gasket on the pane and then fitting the gasket-pane assembly into a two-part mold and plastically deforming the gasket to the desired shape.

Such a procedure is fairly complex and represents a major additional step in the manufacture of a motor vehicle, a mass-production operation that can ill afford such additional overhead. In addition such a method does not take into account sloppy tolerances in the shape of the window opening, so that although the pane-gasket assembly can be set to high tolerances, bad tolerances in the window opening still can lead to leaks.

In another known system described in U.S. Pat. No. 4,115,609 of S. Denman the gasket has a thermosetting core in the center of which is embedded a resistance-type heating wire and around which is provided an impervious wrap in turn carrying a pressure-sensitive adhesive. This gasket is fitted between the pane edge and the frame border and electricity is passed through the heating wire as the pane is pressed into the window opening. As the core is heated it softens and allows the gasket to assume a shape externally complementary to the opening border and internally complementary to the pane edge.

Such an arrangement is fairly complicated, entailing several steps to mount the pane. In addition the gasket itself is a complex and expensive item.

OBJECTS OF THE INVENTION

It is therefore an object of the present invention to provide an improved fixed-pane assembly for a motor-vehicle window.

Another object is the provision of such a fixed-pane assembly for a motor-vehicle window which overcomes the above-given disadvantages, that is which is fairly inexpensive to manufacture and assemble, yet which provides a solid mounting for the pane and a leaktight seal between the window edge and the frame border.

Yet another object is to provide an improved method of mounting a pane in the window opening of a motor-vehicle body.

SUMMARY OF THE INVENTION

A method of mounting a rigid window pane having an edge into a rigid window opening having a rigid border with an annular gasket according to this invention comprises the steps of first providing on the outer periphery of the gasket a layer of adhesive and fitting the gasket around the edge of the pane. Then the pane carrying the gasket is fitted to the window opening with the adhesive layer engaging the opening border and at the same time the pane carrying the gasket is heated and pressed into this opening to soften the gasket until it externally deforms plastically to complementarily fit the opening border. Subsequently the gasket is cooled and cured so it hardens and retains the shape imparted to it by the heat and pressure.

According to this invention the gasket is formed of a thermoplastic synthetic resin or of a vulcanizable or polymerizable, that is heat-curing, synthetic resin or rubber. The polymerization can include the processes of polycondensation or polyaddition.

In accordance with a further feature of this invention the adhesive is heat-activatable and is activated when the gasket is heated. It can also be contact-activatable and is activated when the gasket is pressed into the window border. Adhesives usable according to this invention can be of the thermally or chemically activatable type and can in fact be applied to the window opening instead of to the gasket. Standard adhesives made of methylmethacrylate, polyamide, polyurethane, or epoxies can be used. In addition hot-melt glues formed of styrolbutadiene, ethylene-vinyl-actetate, polyamide, polyaminoamide, or copolymers are also usable.

The gasket according to the present invention can be provided on the edge of the pane by extruding it directly thereon in accordance with the RIM method described in German patent document 3,203,580. It can also be adhesively bonded to the pane edge and mechanical clips or trim can be provided to secure the gasket in place.

According to the instant invention, therefore, the fitting of the gasket to the window opening can be carried out with no extra steps, and without the need of any supplementary forming equipment. The window opening itself acts as a mold.

A window assembly according to this invention has a rigid window pane having an edge, a motor-vehicle body formed with a rigid window opening having a rigid border, an annular gasket of a heat-softenable material having an inner periphery form-fitted by heat and pressure around the pane edge and an outer periphery form-fitted by heat and pressure around the window border, and means for adhering the outer periphery of the gasket to the opening border. The gasket can be of a thermoplastic synthetic resin or of a heat-curing vulcanizable synthetic resin. The means is a layer of adhesive.

DESCRIPTION OF THE DRAWING

The above and other features and advantages will become more readily apparent from the following, reference being made to the accompanying drawing in which.

SPECIFIC DESCRIPTION

Figure 1:
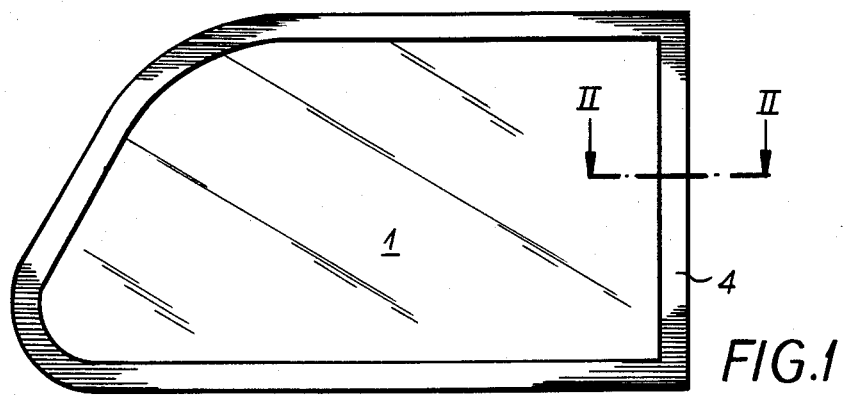
FIG. 1 is a small-scale elevational view of a window pane and gasket according to this invention.
Figure 2:
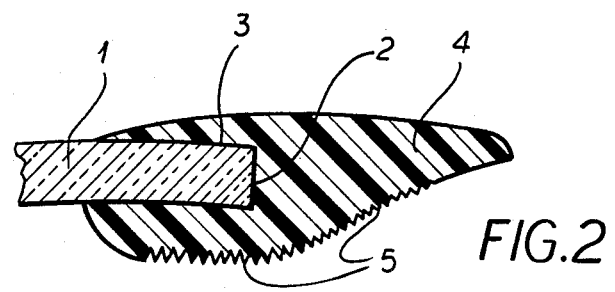
FIG. 2 is a large-scale section taken along line II—II of FIG. 1.
Figure 3:
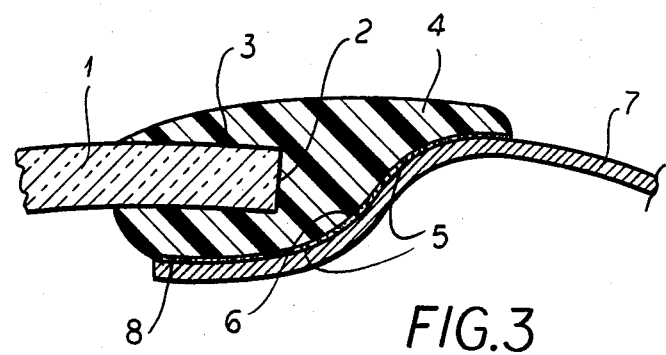
FIG. 3 is a view like FIG. 2 but showing the installed pane and gasket.

As seen in FIGS. 1 and 2 a rigid window pane 1, normally made of tempered or laminated safety glass, has an outer edge 2 fitted in a groove 3 in the inner periphery of an annular gasket 4. The gasket 4 is here formed of a thermoplastic synthetic resin or a vulcanizable, that is thermosetting, resin and is free of any inlay. It is provided with fitting elements 5 to fit it to the inner border 6 of a window opening 7 of a motor-vehicle body. The pane 1 and gasket 4 are fitted to the opening 6 by pressing them in place therein and simultaneously heating at least the formations 5 so that same are rendered plastic and deform to conform perfectly to the shape of this border 6. In addition it is possible to provide an adhesive layer 8 between the gasket 4 and the opening 6.

What is claimed is:

1. A method of mounting a rigid window pane having an edge into a rigid window opening having a rigid border, the method comprising the steps of sequentially:
   fitting to the edge of the pane an annular and thermoplastically and permanently deformable gasket formed of a thermoplastic or heat-curing synthetic resin and having an external portion having an outer surface carrying a layer of adhesive;
   fitting the pane carrying the gasket to the window opening with the adhesive layer engaging the opening border;
   simultaneously
      pressing the pane carrying the gasket to the window opening,
      heating and softening at least the portion having the outer surface of the gasket, and
      plastically deforming and complementarily fitting the pane to the opening border; and thereafter simultaneously
   cooling and curing the gasket, and
   pressing the pane carrying the gasket to the window opening
      until the gasket hardens and permanently retains the shape imparted to it by the heat and pressure.

2. The method defined in claim 1 wherein the adhesive is heat-activatable and is activated when the gasket is heated.

3. The method defined in claim 1 wherein the adhesive is contact-activatable and is activated when the gasket is pressed into the window border.

4. The method defined in claim 1 wherein the gasket is provided on the edge of the pane by extruding it directly thereon.

5. The method defined in claim 1, further comprising the step of adhesively bonding the gasket to the pane edge.

6. The improvement defined in claim 1 wherein said frame is formed from a thermoplastic synthetic resin which is heated and thereby plastified for insertion in the sash to conform to the configuration thereof by cooling after it has been pressed into the sash.

7. In a method of mounting a window, consisting of a window pane and a deformable window frame, in a window opening in a body and wherein the window frame is retained in a plastically deformed state and secured by an adhesive in said opening while conforming to the shape thereof, the improvement wherein the window frame bound to the window pane is pressed into a window sash defining said opening by the use of pressure and heat and adapts to the shape of the sash which serves as a shape imparting element therefor and is bonded with an adhesive in its shaped form to the sash.

8. The improvement defined in claim 7 wherein the frame is formed from heat vulcanizable rubber or heat polymerizable synthetic resin, the frame being pressed in a heated state into the sash and is fixed in its shaped form within the sash by vulcanization or polymerization.

9. The method defined in claim 7 wherein the frame and/or the sash, prior to insertion of the window is provided with a thermally activatable adhesive which is activated by the heat supplied in association with the pressing of the window into the sash.

10. A window for carrying out the method of claim 7 wherein the pane is received in a groove in the frame, the frame is composed at least in part of a thermoplastic element and is formed with elements adapted to fit tightly on shaping elements of the sash, at least the elements of the frame are plastifiable by heat and can be plastified upon insertion into the frame to adjust to the shape of the elements of the sash in the plastified shape, and are then cooled to fix the elements in shape conforming states.

11. A window for carrying out the method of claim 7 wherein the frame is composed at least in part of a partly vulcanizable and thereby hardenable elastomer, the frame has elements adapted to be shaped to fit against shaping elements of the sash and at least the elements of the frame are vulcanizable to fix them in shape conforming relation to the elements of the sash upon passing them into the sash.

12. The method defined in claim 7 wherein the frame and/or the sash prior to insertion of the window is provided with a contact adhesive which is activated prior to or upon passing of the window into the sash.

13. The window defined in claim 12 wherein said frame is injection molded onto said pane.

14. The window as defined in claim 12 wherein said frame is preformed, seated on said pane with said groove and adhesively bonded to said pane.

* * * * *